(12) United States Patent
Segal et al.

(10) Patent No.: US 10,871,579 B2
(45) Date of Patent: Dec. 22, 2020

(54) SYSTEM AND METHOD FOR SATELLITE POSITIONING

(71) Applicant: Swift Navigation, Inc., San Francisco, CA (US)

(72) Inventors: Benjamin Lipeles Segal, San Francisco, CA (US); Alexander Thomas Kleeman, San Francisco, CA (US); Anthony Mark Cole, San Francisco, CA (US); Matthew Peddie, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 16/685,927

(22) Filed: Nov. 15, 2019

(65) Prior Publication Data

US 2020/0158886 A1   May 21, 2020

Related U.S. Application Data

(60) Provisional application No. 62/768,499, filed on Nov. 16, 2018.

(51) Int. Cl.

| | | |
|---|---|---|
| *G01S 19/44* | (2010.01) | |
| *G01S 19/51* | (2010.01) | |
| *G01S 19/39* | (2010.01) | |
| *G01S 5/00* | (2006.01) | |
| *G01S 19/07* | (2010.01) | |
| *G01S 19/25* | (2010.01) | |
| *G01S 19/37* | (2010.01) | |
| *G01S 19/04* | (2010.01) | |

(52) U.S. Cl.
CPC ............ *G01S 19/44* (2013.01); *G01S 5/0054* (2013.01); *G01S 19/04* (2013.01); *G01S 19/07* (2013.01); *G01S 19/258* (2013.01); *G01S 19/37* (2013.01); *G01S 19/393* (2019.08); *G01S 19/51* (2013.01)

(58) Field of Classification Search
CPC ........ G01S 19/44; G01S 19/393; G01S 19/04; G01S 19/07; G01S 19/258; G01S 19/37; G01S 19/51; G01S 5/0054
USPC ................................ 342/27, 357.27, 357.38
See application file for complete search history.

(56) References Cited

U.S. PATENT DOCUMENTS 5,451,964 A   9/1995   Babu
5,610,614 A   3/1997   Talbot et al.
(Continued)

OTHER PUBLICATIONS

Collin, Jussi et al., "TKT-2546 Methods for Positioning" Tampere University of Technology, 2010, 50 pages.
(Continued)

*Primary Examiner* — Erin F Heard
*Assistant Examiner* — Michael W Justice
(74) *Attorney, Agent, or Firm* — Jeffrey Schox; Diana Lin

(57) ABSTRACT

A system and method for determining a position of a mobile receiver including receiving a set of satellite observations, the set of satellite observations corresponding to a set of satellites; determining a state vector at each of a plurality of filters, wherein each filter determines the respective state vector based on a unique subset of the set of satellite observations; after a convergence criterion is satisfied, determining a converged state vector based on the respective integer ambiguity hypotheses; and determining the position of the mobile resolver based on the converged state vector.

23 Claims, 6 Drawing Sheets

(56) References Cited

U.S. PATENT DOCUMENTS

| | | | | |
|---|---|---|---|---|
| 5,825,326 | A | * | 10/1998 | Semler ............ G01S 19/37 342/357.27 |
| 6,205,400 | B1 | * | 3/2001 | Lin ............ G01C 21/165 342/357.31 |
| 6,424,914 | B1 | * | 7/2002 | Lin ............ G01C 21/165 342/357.29 |
| 6,427,122 | B1 | * | 7/2002 | Lin ............ G01C 21/165 342/26 B |
| 8,013,789 | B2 | | 9/2011 | Van et al. |
| 8,368,591 | B2 | * | 2/2013 | Talbot ............ G01S 19/44 342/357.27 |
| 9,146,319 | B2 | | 9/2015 | Leandro |
| 9,709,683 | B2 | | 7/2017 | Leandro et al. |
| 10,422,885 | B2 | | 9/2019 | Dai et al. |
| 2002/0120400 | A1 | * | 8/2002 | Lin ............ G01S 19/28 701/470 |
| 2007/0120733 | A1 | * | 5/2007 | Vollath ............ G01S 19/44 342/357.27 |
| 2016/0320493 | A1 | * | 11/2016 | Wu ............ G01S 19/41 |
| 2019/0004180 | A1 | | 1/2019 | Jokinen |
| 2020/0041658 | A1 | * | 2/2020 | Laurichesse ............ G01S 19/32 |

OTHER PUBLICATIONS

Guorui, Xiao, "A computationally efficient approach for isolating satellite phase fractional cycle biases based on Kalman filter" 19th EGU General Assembly, EGU2017, proceedings for the conference held Apr. 23-28, 2017 in Vienna., p. 12495.
Parkins, Alexander James Performance of precise marine positioning using future modernised global satellite positiong syastems and a novel partial ambiguity resolution technique Department of Civil, Environmental and Geomatic Engineering, Aug. 2009.
Richardson, Julian, "Flexible Generation of Kalman Filter Code" NASA Technical Reports Server (NTRS), Document ID 20060019115.
Takasu, Tomojii et al., "Kalman-Filter-Based Integer Ambiguity Resolution Strategy for Long-Baseline RTK with Ionosphere and Troposphere Estimation" Tokyo University of Marine Science and Technology, Japan, revised Oct. 3, 2010 11 pages.
Teunissen, P. J. G. "The least-squares ambiguity decorrelation adjustment: its performance on short GPS baselines and short observation spans", Journal of Geodesy, (1997) 71: 589-602, 14 pages.
Weiss, Berntrop, K. et al., "GNSS Ambiguity Resolution by Adapteive Mixture Kalman Filter" TR2018-103, Jul. 13, 2018.
Chiu David S.; et al. "Bierman-Thorton UD Filtering for Double-Differenced Carrier Phase Estimation Accounting for Full Mathematical Correlation," Jan. 2008, ION NTM 2008, pp. 756-762.

* cited by examiner

SYSTEM AND METHOD FOR SATELLITE POSITIONING

CROSS-REFERENCE TO RELATED APPLICATIONS

This application claims the benefit of U.S. Provisional Application No. 62,768,499, filed 16 Nov. 2018, which is incorporated in its entirety by this reference.

This application is related to U.S. application Ser. No. 16/195,427, filed 19 Nov. 2018, and U.S. Pat. No. 9,933,528, filed on 12 Feb. 2015, each of which is incorporated in its entirety by this reference.

TECHNICAL FIELD

This invention relates generally to the satellite positioning field, and more specifically to a new and useful system and method in the satellite positioning field.

BACKGROUND

Being able to perform high precision satellite positioning is important for a wide variety of applications. Unfortunately, current GPS solutions are often either inaccurate or require processor power beyond the capabilities of inexpensive hardware (either locally or in the cloud). A number of solutions have been proposed to address this problem, including Precise Point Positioning (PPP), Real Time Kinematic (RTK) satellite positioning, and lambda methods. However, all satellite positioning solutions are made less efficient by noise and errors in receiver observations. The use of interleaving filters may reduce the effects of this noise.

Thus, there is a need in the satellite positioning field to create a new and useful system and method. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
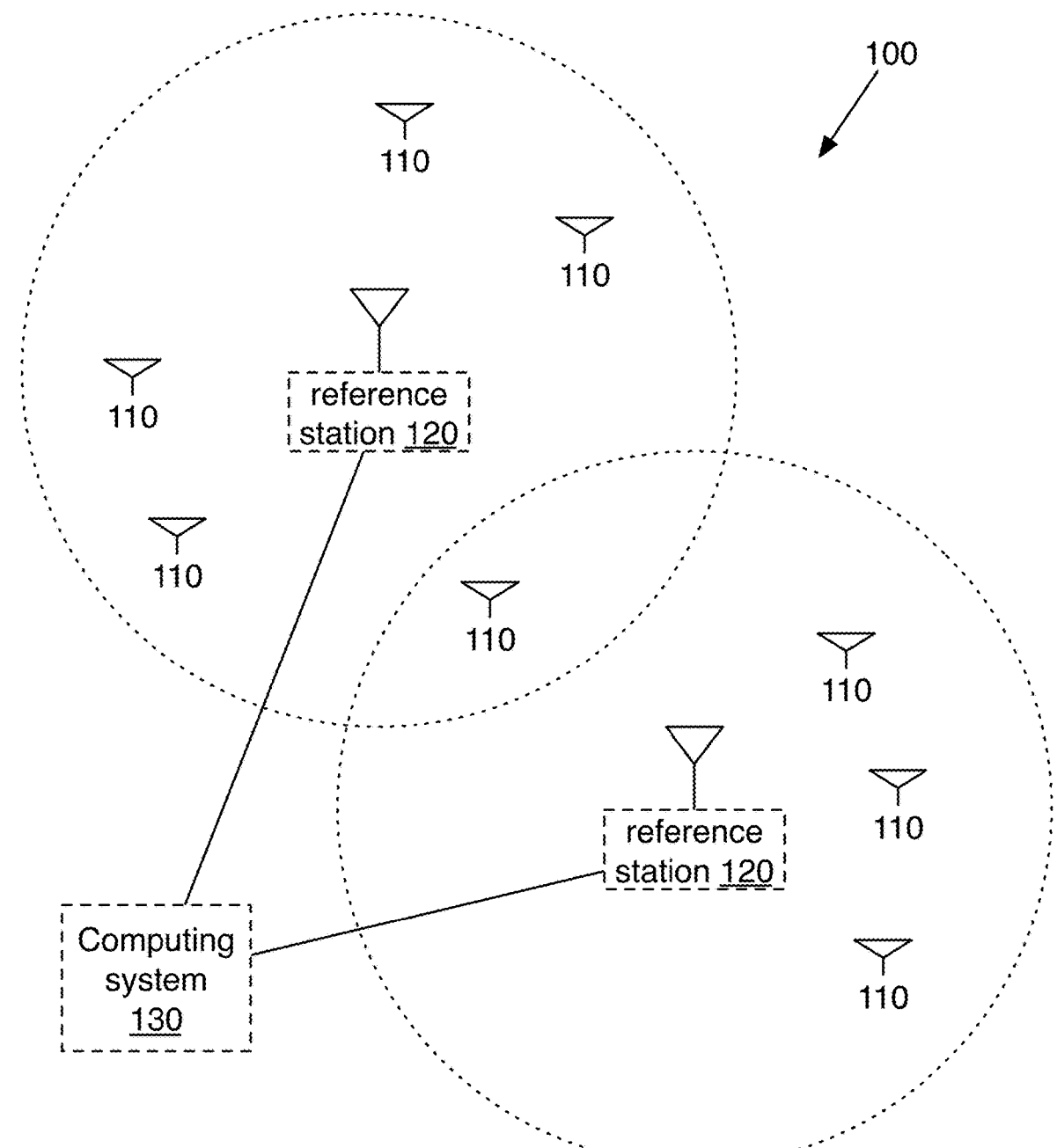
FIG. 1 is a diagram representation of a system of an invention embodiment.
Figure 2:
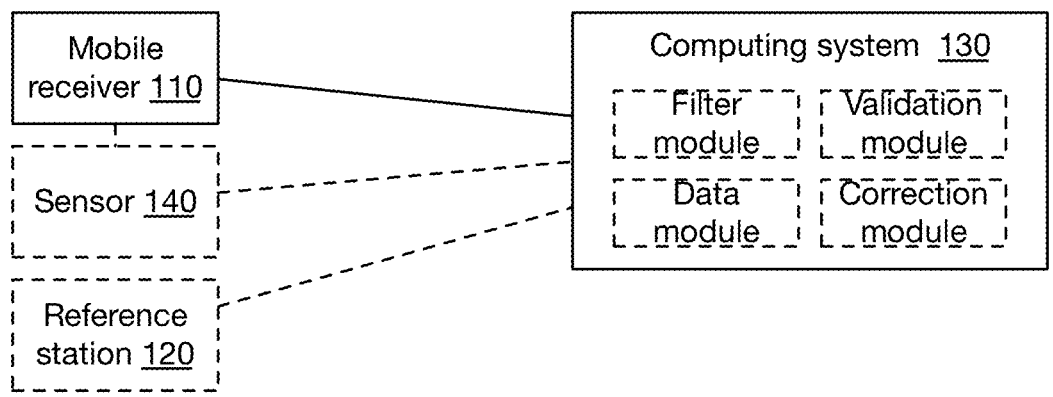
FIG. 2 is a schematic representation of an embodiment of a system.

As shown in FIGS. 1 and 2, the system 100 includes a mobile receiver 110 and a computing system 130. The system can optionally include one or more reference stations 120, one or more sensors 140, and/or any suitable components. As shown for example in FIG. 3, the mobile receiver preferably includes one or more antennas, a front-end module, a satellite signal management module, a microcontroller, an input/output module, and/or any suitable components. The computing system can include one or more filter modules, a data module, and a validation module. The computing system can optionally include a correction module, and/or any suitable components.

Figure 4:
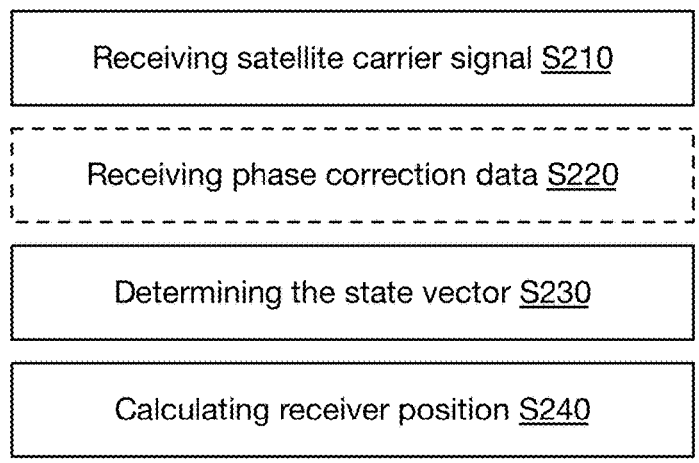
FIG. 4 is a chart representation of a method of an invention embodiment.

As shown in FIG. 4, the method 200 can include receiving satellite observations, determining state vectors, and determining the position of the mobile receiver. The method can optionally include correcting the satellite observations and/or any suitable steps. The method preferably functions to determine the location of a mobile receiver; however, the method can additionally or alternatively be used to determine the location of an external system (e.g., an external system coupled to the system) and/or used in any suitable manner.

Embodiments of the system and/or method can be used, for example, in autonomous vehicle guidance (e.g., for unmanned aerial vehicles (UAVs), unmanned aerial systems (UAS), self-driving cars, agricultural equipment, robotics, rail transport/transit systems, etc.), GPS/GNSS research, surveying systems, and/or may be used for any suitable operation. In specific examples, the system (and/or components) can be coupled to any suitable external system such as a vehicle (e.g., UAV, UAS, car, truck, etc.), robot, railcar, user device (e.g., cell phone), and/or any suitable system. Additionally, the mobile receivers 110 may be designed to utilize open-source software firmware, allowing them to be easily customized to particular demands of end user applications, easing system integration and reducing host system overhead; however, the mobile receivers can be designed in any suitable manner.

2. Benefits.

Variations of the technology can confer several benefits and/or advantages.

First, variants of the technology can achieve high precision positioning for a mobile receiver. In specific examples, determining an integer ambiguity can increase the precision with which a mobile receiver position can be determined (such as achieving centimeter or better positioning of a mobile receiver).

Second, variants of the technology can enable mobile receivers 110 to be used in applications where previous GNSS solutions were not accurate enough, too large, too expensive, and/or too power hungry. In specific examples of the technology, the use of a plurality of filters at substantially the same time can enable a small form factor, low cost, low power consumption, and increased accuracy (e.g., of position estimates).

Third, variants of the technology can reduce and/or mitigate noise and/or errors (e.g., inaccurate data) in data inputs (e.g., satellite observations, sensor readings, etc.). In specific examples, by using a unique subset of the data inputs for each filter can reduce and/or mitigate the impact of noise and/or errors. In this specific example, the bad data can be spread across multiple filters, decreasing the effect of inaccurate data on the estimates from a single filter. In other examples, feeding different filters different unique observation subsets enables the respective resultant states (e.g., carrier phase ambiguities) to be independently verified against each other.

Fourth, variants of the technology can be agnostic to the specific mobile receiver. In specific examples, the technology can interface with any mobile receiver (e.g., antenna). For example, satellite observations at any frequency and from any satellite constellation can be used to determine the position of the mobile receiver.

However, variants of the technology can confer any other suitable benefits and/or advantages.

3. Traditional GNSS, PPP, and RTK

Traditional satellite positioning systems (e.g., standard GNSS) work by attempting to align a local copy (at a receiver) of a pseudorandom binary sequence with a satellite-transmitted copy of the same sequence. The signal transmitted by the satellite is delayed based on the distance between the satellite and the receiver. By delaying the local copy of the sequence to match the satellite-transmitted copy, the time it takes the signal to travel from the satellite to the receiver (e.g., time lag) can be determined. This time lag can in turn be used to calculate the distance between the satellite and receiver. By performing this process for multiple satellites (typically four or more), a position of the receiver relative to the satellites can be found, which can in turn be used to find the position in a particular geographic coordinate system (e.g., latitude, longitude, and elevation). Typical GNSS systems can achieve at best 2 m accuracy in positioning.

For many applications (e.g., guidance for human-carrying autonomous vehicles/drones/agricultural equipment, GPS/GNSS research, surveying, etc.), this level of accuracy is inadequate. In response, multiple position correction algorithms have been developed such as: precise point positioning (PPP), real time kinematic (RTK), and lambda method.

Instead of solely using the pseudo-code broadcast by satellites, PPP and RTK also make use of satellite signal carrier phase to determine position. While much higher accuracy is possible using carrier phase data, accurately determining a position of a mobile receiver (e.g., the receiver) requires accounting for a number of potential sources of error. Further, carrier phase measurements are ambiguous; because the carrier signal is uniform, it may not be possible to differentiate between a phase shift of $\phi$ and $2\pi N + \phi$ using phase measurements alone, where N is an integer. For example, it may be difficult to determine the difference between a phase shift of $\pi$ radians and a phase shift of $3\pi$ radians (or $-\pi$, $5\pi$, etc.).

PPP attempts to solve this issue by explicitly modeling the error present in mobile receiver phase and code measurements. Some errors are global or nearly global (e.g., satellite orbit, clock errors, etc.); for these errors, PPP typically uses correction data with highly accurate measurements. However, for local errors (i.e., error that is substantially dependent on mobile receiver location), PPP is only capable of rough modeling. Fortunately, many local errors change slowly in time; resultantly, PPP can achieve high accuracy with a single receiver, but may require a long startup time to precisely determine local errors.

RTK avoids a large majority of the modeling present in PPP by use of GNSS reference stations (with precisely known locations). Reference station data is taken from reference stations near the mobile receiver (e.g., distance between the reference station and mobile receiver is less than 20 km); therefore, differencing the reference station and mobile receiver observations can result in reduced error (e.g., because local error changes slowly). The result is that RTK solutions can converge more quickly than PPP solutions (and without the high accuracy global corrections data needed by PPP). However, RTK solutions require the presence of reference stations near a mobile receiver.

For these positioning solutions, the presence of corrupted or otherwise inaccurate observation data (either at a receiver or as an input for corrections generation) has the potential to reduce solution accuracy and efficiency (for example, the presence of outlier data may increase convergence time for a given solution).

RTK can be based on a mixed integer programming model obtained by omitting the noise term from the double differenced model, wherein the solved-for unknowns are: $\Delta'x$, and the double-differenced integer ambiguity $\Delta'N_{ij}$. The integer ambiguity can be solved for using: the Ambiguity Function Method (AFM), Fast Ambiguity Resolution Approach (FARA), Least-Squares Ambiguity Search Technique (LSAST), Least-Squares Ambiguity Decorrelation Adjustment (LAMBDA), and/or any other suitable integer ambiguity resolution method.

Embodiments of the system and method of the present disclosure are directed to using a set of (e.g., plurality of) filters, where each filter operates on a unique subset of data (e.g., satellite observations), for satellite positioning techniques. These embodiments can in turn enable increased accuracy, efficiency, and/or other metrics of positioning performance (e.g., accuracy of corrections data).

4. System

As shown in FIGS. 1 and 2, the system 100 includes a mobile receiver 110 and a computing system 130. The system 100 may additionally include reference stations 120 and/or a computing system 130. The system 100 preferably functions to estimate (e.g., determine, update, etc.) the position of the mobile receiver no with high accuracy (e.g., mm resolution, cm resolution, dm resolution, etc.), wherein the mobile receiver position can be used to determine the external system position. The system 100 preferably functions to perform satellite positioning using a novel form of filtering (described in more detail in the section on the method 200).

The mobile receiver no preferably functions to receive a set of satellite observations (e.g., carrier phase data, pseudo-code, etc.) from one or more satellites. The satellite observations can correspond to one or more satellite constellations (e.g., global positioning system (GPS), (GLONASS), BeiDou positioning system (BPS), Galileo, etc.). The mobile receiver can calculate position data (e.g., pseudo-range, phase) from the satellite observations. The mobile receiver is preferably in communication with the reference station(s) and the computing system; however, additionally or alternatively, the mobile receiver can include the computing system and/or any suitable components. The mobile receiver is preferably a stand-alone device (e.g., a GNSS receiver); however, the mobile receiver can be a user device (e.g., smart phone, laptop, cell phone, smart watch, etc.), can be integrated with an external system (e.g., component of an automobile, aero vehicle, nautical vehicle, etc.), and/or can be configured in any suitable manner. As shown for example in FIG. 3, variants of the mobile receiver 110 can include one or more antennas 111, a front-end module 112, a satellite signal management module (SSMM) 113, a microcontroller (μC) 114, and an input/output module (I/O) 115.

The antenna 111 preferably functions to receive one or more satellite observations (e.g., satellite observations). The antenna is preferably coupled to the front-end module; however, can be coupled to any suitable components. The antenna is preferably a radio frequency (rf) antenna; however, the antenna can detect any suitable electromagnetic radiation. In variants with a single antenna, the antenna is preferably configured to receive more than one type of satellite signal (e.g., more than one frequency, signals from more than one satellite constellation, etc.); however, the antenna can be configured in any suitable manner. In variants with a plurality of antennas, each antenna can detect a different satellite signal (e.g., signal from one satellite constellation; signal at a single frequency such as L1, L2, L5, E1, E2, E5a, E5b, E6, G1, G3, etc.; etc.); however, the different antennas can detect the same satellite signals and/or can detect any suitable signal(s).

The antenna(s) can be patch antennas (including rectangular and planar inverted F), reflector antennas, wire antennas (including dipole antennas), bow-tie antennas, aperture antennas, loop-inductor antennas, and fractal antennas. Antenna(s) are preferably made out of a conductive material (e.g., metal); however, the antennas may additionally or alternatively include dielectric materials (e.g., to modify the properties of the antennas, provide mechanical support, etc.) and/or include any suitable materials. In variants including more than one antenna, the antennas can be the same and/or different type of antenna. The antenna structure may be static and/or dynamic (e.g., a wire antenna that includes multiple sections that may be electrically connected or isolated depending on the state of the antenna). Antennas may receive (and/or emit) isotropic or anisotropic radiation patterns (e.g., the antennas may be directional). In variants where the antenna(s) are directional, their radiation pattern may be dynamically alterable. In a specific example, an antenna with a radiation pattern that preferentially receives radiation from one direction may be rotated to change the radiation pattern direction. However, the antenna can be configured in any suitable manner.

The antenna can optionally include an antenna coupler. The antenna coupler can function to couple the antenna (e.g., a satellite signal-ready antenna) to the mobile receiver 110 (e.g., front-end module of the mobile receiver). In variants of the mobile receiver where the antenna coupler couples to multiple antennas, the antenna coupler may split power between the antennas (e.g., using a splitter); additionally or alternatively, the antenna coupler may include a switch to select between the multiple antennas, or the antenna coupler may couple to the antennas in any suitable manner.

The front-end module 112 preferably functions to convert signals received by the antenna 111 to digital baseband signals for processing. The front-end module 112 preferably includes an analog-to-digital converter (e.g., the Maxim MAX2769) capable of operating at high sample rates (e.g., up to 50 Msps, up to 100 Msps, up to 200 Msps, etc.). The front-end module 112 is preferably capable of converting any suitable satellite signals (e.g., signals from any satellite constellation, any satellite frequency, etc.); however, the mobile receiver 110 may include multiple front-end modules 112 for different bands, and/or be configured in any suitable manner.

The satellite signal management module 113 functions to track satellite(s) (e.g., track satellite signals). The satellite signal management module preferably includes flexible and fully programmable correlators that may be used by the microcontroller 114 (e.g., to implement tracking loops, acquisition algorithms, etc.). The satellite signal management module 113 may include programmable digital notch filters (e.g., for performing continuous wave noise cancellation). The satellite signal management module 113 is preferably implemented on an Field Programmable Gate Arrays (FPGA) Additionally or alternatively, the satellite signal management module 113 may be implemented by any suitable circuit.

The microcontroller 114 preferably functions to perform signal processing above the correlator level on the mobile receiver 110 (e.g., tracking loop filters, acquisition management, navigation processing, etc.). The microcontroller 114 additionally or alternately manages communication over the input/output module 115. The microcontroller 114 preferably is able to perform calculations (e.g., position, velocity, time (PVT) solutions) at a rate of 50 Hz or higher; however, the microcontroller can perform calculations at any suitable rate.

The input/output module 115 preferably functions to transmit and/or receive data from the mobile receiver 110. The input/output module 115 is preferably used to couple the mobile receiver 110 to a radio modem (e.g., ultrahigh frequency (UHF) radio modem). The input/output module is preferably in communication with one or more reference stations 120 (e.g., to receive correction signals over the UHF radio modem). The input/output module 115 may additionally or alternatively be used for any other suitable transmission or reception of data from the mobile receiver 110 (e.g., the mobile receiver 110 may transmit raw navigation data over the input/output module 115 to a control computer on a UAV, or the mobile receiver 110 may transmit data through a Bluetooth or cellular modem connected to the input/output module 115). The input/output module 115 preferably includes one or more Universal Asynchronous Receiver/Transmitter (UART) connections; however, the input/output module can include connections for any other suitable input/output communications; for example, the input/output module 115 may include a USB port.

The reference station(s) 120 preferably function to transmit phase data of signals received at the reference stations 120. The reference stations can function to determine corrections (e.g., local and/or global corrections such as to account for atmospheric effects) to the satellite signals. The reference stations 120 utilized by the system 100 are preferably public reference stations; however, the reference stations be private reference stations or any other suitable reference stations. The reference stations 120 are preferably separate (e.g., located away) from the mobile receiver 110 or external system, but can alternatively be collocated.

The location (e.g., position) of the reference station(s) is preferably known to a high degree of accuracy (e.g., less than 1 mm, 1 cm, 1 dm, 1 m, etc. of uncertainty in the location of the reference station). The location of the reference station is preferably the location of the antenna used to receive satellite signals. However, the location of the reference station may be determined in any manner yielding a high degree of accuracy; for example, reference station 120 location may be determined by a number of single frequency carrier phase receivers set around the reference station 120 at vertical and horizontal reference points. Note that while reference stations 120 are preferably fixed in location, they may additionally or alternatively be mobile. The location of the reference station is preferably re-determined to high accuracy before moved reference stations 120 re-start providing data (e.g., phase data, correction data, etc.); however, reference stations 120 may provide phase data before location re-determination (e.g., for use in attitude estimation). As another alternative, reference stations 120 may not provide absolute location data; for example, absolute location data of the reference station 120 may not be needed for applications including attitude estimation.

Reference stations 120 preferably provide phase data for multiple satellite signals and the location of the reference station via the internet; however, reference stations can provide data by any other suitable method (e.g., transmission by UHF-band radio modem). Reference station 120 data is preferably made available directly to the mobile receiver(s) 110, but may additionally or alternatively be processed or aggregated before being made available to mobile receiver(s) 120.

In one variation of a preferred embodiment, data from multiple reference stations 120 can be combined at a server (e.g., computing system such as a central processing server). In this variant, the server can use the reference station 120 data to create a virtual reference station. In this variant, multiple reference stations can be used to correct for error in relative positioning of a mobile receiver no that increases with the distance between the mobile receiver and the reference station 120. By comparing data from multiple reference stations 120, distance-dependent systematic errors (e.g., those caused by ionospheric and tropospheric refractions or satellite orbit errors) can be modeled (e.g., in one or more error models) more precisely. The server can use these error models to predict the reference data that would be transmitted by a reference station near the mobile receiver no; from this prediction, data from a 'virtual reference station' with a location near the mobile receiver 110 can be transmitted to the mobile receiver 110 and used to increase mobile receiver no positioning accuracy. However, data from one or more reference stations can be used in any suitable manner.

The computing system (e.g., central processing server) 130 preferably functions to process data from reference stations 120 and mobile receivers no. The computing system 130 may process this data for multiple purposes, including aggregating data (e.g., tracking multiple mobile receivers, integrating satellite observations and sensor data, etc.), system control (e.g., providing flight directions to a UAV based on position data received from a mobile receiver no attached to the UAV), position calculation (e.g., performing calculations for mobile receivers 110 that are offloaded due to limited memory or processing power, receiver position determination, etc.), correction calculation (e.g., local and/or global correction data such as to correct for clock errors, atmospheric corrections, etc.), and/or the computing system can process the data in any suitable manner. The computing system 130 may additionally or alternatively process data to perform all or part of the method 200. The computing system 130 may additionally or alternatively manage reference stations 120 or generate virtual reference stations for mobile receiver(s) 110 based on reference station 120 data. The computing system 130 may additionally or alternatively serve as an internet gateway to mobile receiver 110 data if mobile receivers 110 are not internet connected directly. The computing system 130 can be local (e.g., internet-connected general-purpose computer, processor, etc.), remote (e.g., central processing server, cloud, server, etc.), distributed, and/or configured in any suitable manner. In a specific example, the computing system can calculate the receiver position based on the states (e.g., converged state vectors) from a plurality of filters. However, the computing system can determine the receiver position in any suitable manner and/or using any suitable data.

The computing system is preferably in communication with the sensor(s) and the mobile receiver(s). The computing system is preferably remote from the mobile receiver(s), but can additionally or alternatively be integrated into the mobile receiver (and/or external system), and/or configured in any suitable manner. In variants of the computing system, the computing system preferably includes one or more: correction modules 132, data modules 134, filter modules 136, and/or validation modules 138, connected in series, in parallel, and/or a combination thereof. However, the computing system can include any other suitable set of modules arranged in any other suitable manner.

The correction modules preferably function to correct satellite observations (e.g., as described in S220); such as to remove outliers; correct systematic inaccuracies in the observations such as clock errors, relativistic corrections, or atmospheric corrections, or otherwise correct satellite observations. All or a subset of satellite observations from all or a subset of the satellites can be corrected. Corrections (e.g., systematic inaccuracies, errors, etc.) to the satellite observations can include: timing errors (such as receiver clock errors, satellite clock errors, etc.), atmospheric effects (such as ionosphere corrections, troposphere corrections, etc.), relativistic corrections, local corrections, global corrections, multipath errors, receiver errors, hardware errors, and/or any suitable corrections. In variants of the correction module, reference station data can be used to determine corrections to the satellite observations. However, additionally or alternatively, corrections can be determined from models (e.g., atmospheric models), comparison (e.g., by comparing results for one or more nearby mobile receivers, one or more reference stations, etc.), and/or in any suitable manner. In a specific example, the correction module can calculate double-differences satellite observations (e.g., between mobile receiver satellite observations and reference station satellite observations); however, the correction module can determine single-differenced satellite observations, triple-differenced satellite observations, undifferenced satellite observations, and/or can determine any suitable data.

The data module(s) preferably function to receive data (e.g., satellite observations, corrected satellite observations, sensor data, digital baseband signal, beat signal, Doppler measurement data, location correction data, etc.) and generate subsets of data (e.g., for interleaved filters; unique subsets of data; overlapping subsets; interleaved subsets; sequential subsets; etc.). The system can include a single data module that processes all data received by the mobile receiver; a different data module for each filter or filter module; a different data module for each satellite or satellite constellation, or any other suitable number of data modules. The data module(s) preferably generate the subsets of data in real-time (e.g., as data is received it is added to a subset, as data is received it is transmitted to a filter, etc.); however, additionally or alternatively, the data modules can generate the subsets asynchronously, retrieve data (e.g., from memory), and/or generate the subsets of data at any suitable time. The data modules are preferably in communication with the mobile receiver, the correction module, and the filter module; however, the data module can be in communication with any suitable components.

The subsets of data (e.g., data subsets) are preferably unique subsets of data; however, any suitable subsets of the data can be generated. A unique subset is preferably unique from other subsets generated from the same data set, but can be otherwise unique. Unique subsets can differ from the other subsets by: at least one satellite observation; include at least one satellite observation not included in any other subset; or otherwise vary. Different subsets can include satellite observations having the same or different (e.g., the data subsets can overlap or not overlap, respectively, in): timestamps, time periods (e.g., data sets), source satellites, signal frequencies (e.g., L1, L2, L5, etc.), satellite constellations, data type (e.g., corrected or raw), or any other suitable observation parameter. Data subsets can be specific to a carrier phase, satellite, satellite constellation, or otherwise specific, or include a combination thereof. Different subsets can optionally include or exclude the same or different auxiliary data types (e.g., sensor data) or points (e.g., specific sensor data points). The data subsets can be generated according to: a set of rules (e.g., observation assignment rules; periodic assignment to different data subsets or filters, in order; etc.), set of patterns, randomly generated, or otherwise generated. All data from the data set from a time period is preferably included (e.g., represented) in the set of data subsets; alternatively, only a portion of the data from the data set can be included in the set of data subsets. In a specific example, each satellite observation (and/or corrected satellite observation) can be included in a single subset of the data. In a second specific example, each satellite observation can be included in two more subsets, but not all of the subsets of the data. However, the subsets of the data can include any suitable data. The number of subsets of data is preferably the same as the number of filters (and/or filter modules); however, the number of subsets of data can be greater than and/or less than the number of filters. Each subset of data is preferably the same size (e.g., has the same total number of satellite observations); however, each subset can have a different size (for example, because a filter associated with a subset stops running). Each data subset can include consecutive observations (e.g., consecutive datum such as satellite observations corresponding to one or more satellites associated with and/or collected during a time window, consecutive observations from an observed satellite, consecutive observations from a sensor, consecutive observations from a satellite constellation, etc.), non-consecutive observations (e.g., non-consecutive datum such as satellite observations corresponding to one or more satellites associated with and/or collected during a time window, non-consecutive observations from an observed satellite, non-consecutive observations from a sensor, non-consecutive observations from a satellite constellation, etc.), and/or combinations thereof.

The data (e.g., included in the subsets, that the subsets are selected from) is preferably associated with (e.g., collected during) a time period (e.g., time window); however, the data can be collected with any suitable timing (e.g., before the time window and/or after the time window). The time period can be any suitable value and/or range thereof between 1 s and 10 min such as 1 min; however, any suitable time period can be used. The data in each subset of data is preferably arranged sequentially (e.g., based on the order in which it was received such as by the mobile receiver, reference station, sensors, etc.; based on the order it was generated; based on a time stamp associated with the data; etc.); however, the data can be arranged based on satellite (e.g., clustering observations associated with an observed satellite, clustering observations associated with a satellite constellation), based on data type (e.g., corrected satellite observations, satellite observations, sensors, etc.), and/or can be arranged in any suitable manner. In variants, each satellite observation can correspond to a satellite observation time (e.g., epoch); however, the satellite observations can be associated with any suitable time.

In specific variants, each subset of data preferably includes one or more satellite observations (e.g., unique satellite observation) associated with (e.g., received from) an observed satellite. The observed satellite preferably remains in the line-of-sight of the mobile receiver for the time period; however, the observed satellite can lose line-of-sight with the mobile receiver (e.g., caused by obstructions, satellite motion, mobile receiver motion, etc.). The observed satellite can correspond to any suitable satellite constellation. Each subset of data preferably receives one or more satellite observations associated with more than one observed satellite; however, each subset of data can include satellite observations from any suitable satellites.

In specific variants where the subset of data include both sensor data and satellite observations, the sensor data and satellite observations are preferably contemporaneous (e.g., the difference in measurement time between the sensor data and satellite observations is less than 10 s, 5 s, 1 s, 100 ms, 10 ms, etc.) or concurrent; however the sensor data and satellite observations can be noncontemporaneous, and/or measured with any suitable timing. The sensor data and satellite observations are preferably interleaved; however, the sensor data and satellite observations can be separated, and/or included in the subset of data in any suitable manner. In a specific example of this specific variant, each subset of data can include unique (e.g., distinct) satellite observations. In this specific example, each subset of data can include all of the sensor data. In this specific example, the satellite observations and the sensor data can be interleaved in each subset of data. however, the subsets of data can include any suitable data and can be arranged in any suitable manner.

In specific embodiments, the data can be included in subsets of data: sequentially (e.g., consecutively), nonsequentially (e.g., nonconsecutively), randomly (e.g., pseudo-randomly), according to a low discrepancy sequence (such as a Halton sequence), deterministically (e.g., to ensure each subset of data meets a predetermined data criteria), and/or the data can be included in each subset in any suitable manner. In specific variants, the predetermined data criteria can include a predetermined number of satellite observations (e.g., corresponding to an observed satellite, satellite constellation, etc.), a predetermined quantity of sensor data, an updating (e.g., dynamically updating, in response to an continuing criterion, convergence criterion, etc.) number of satellite observations (e.g., corresponding to an observed satellite, satellite constellation, etc.), and/or the predetermined data criteria can be any suitable criteria.

Figure 5A:
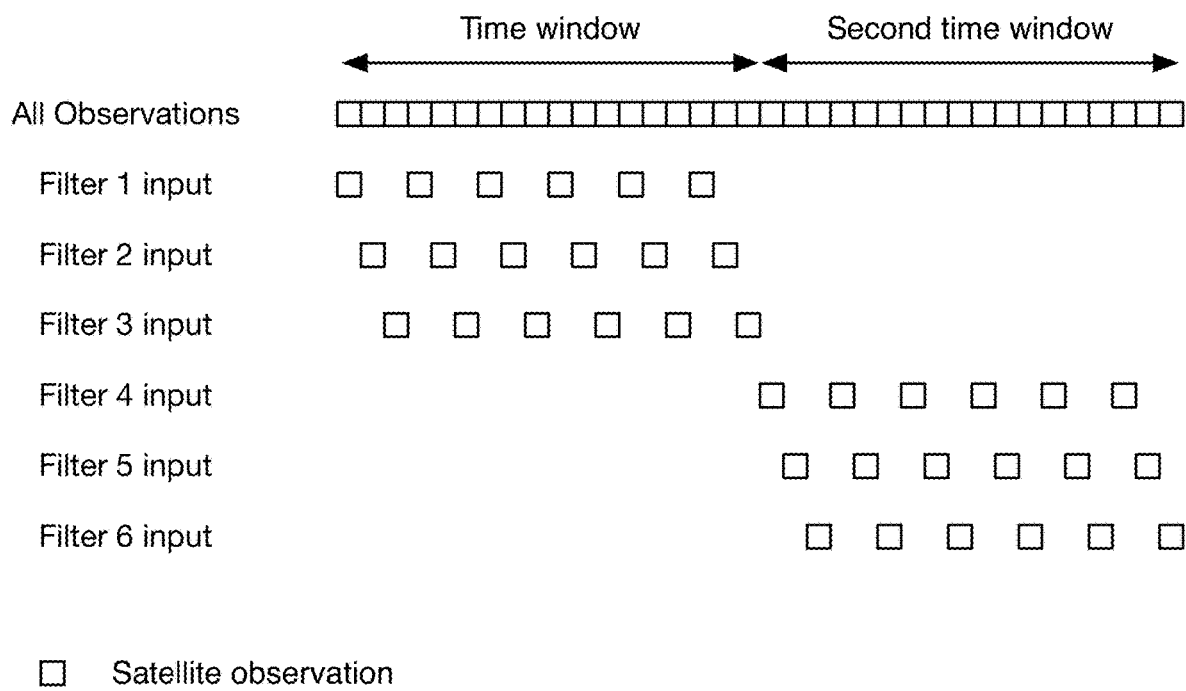
FIGS. 5A, 5B, and 5C are example representations of examples of nonconsecutive; consecutive and overlapping; and consecutive and non-overlapping subsets of the satellite observations, respectively.
Figure 5B:
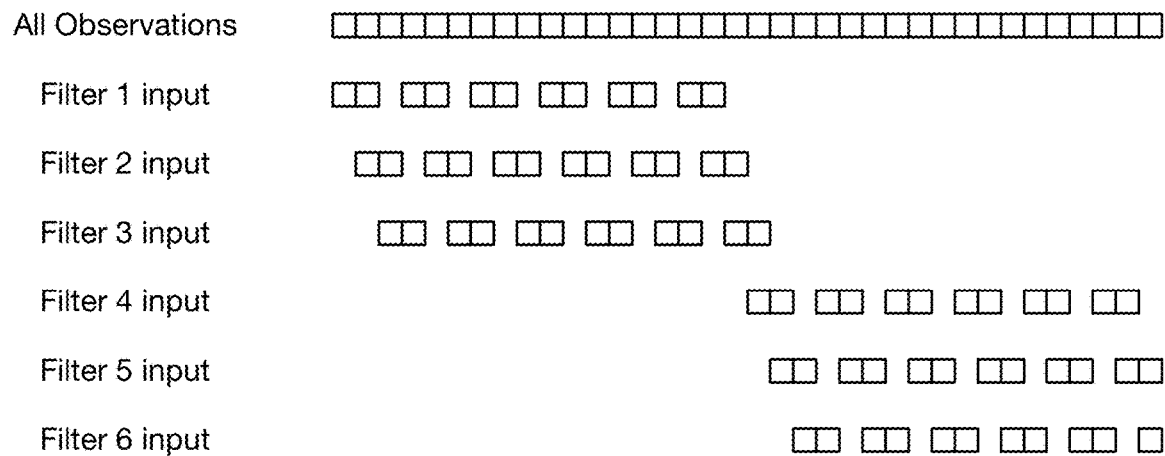
Figure 5C:
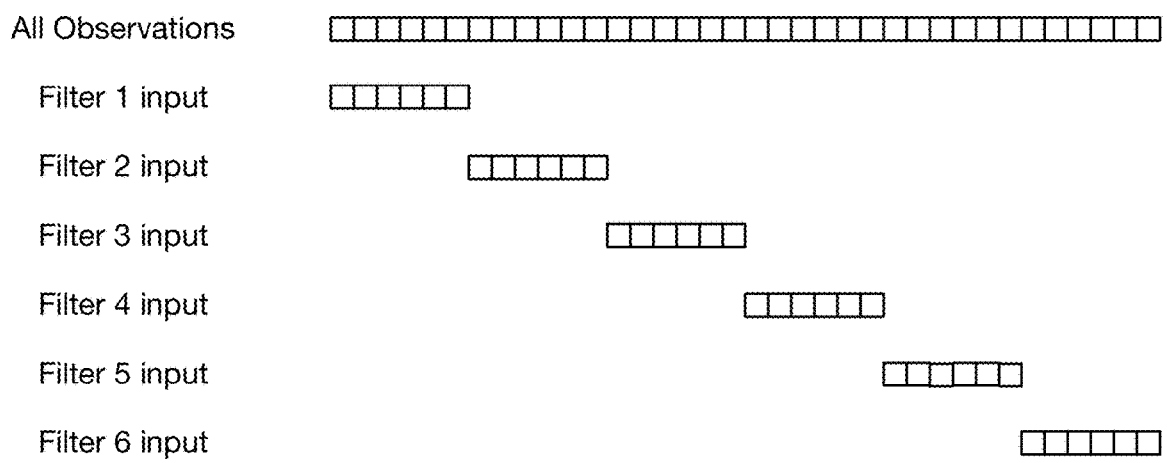

In a first specific example, the data that is included in each subset of data can be interleaved (e.g., round robin). In this example, as shown in FIG. 5A, each piece of data (e.g., incoming piece of data such as sensor data, satellite observation, corrected satellite observation, etc.) can be sequentially included in the next subset of data. In a specific example of data subsets, the first datum (e.g., satellite observation) can be included in the first subset of the data; the second datum can be included in the second data subset; the third datum can be included in the third data subset; the fourth datum can be included in the first data subset; and each incoming piece of datum can be distributed sequentially in a similar manner. However, each datum can be distributed to any suitable data subset. In a second specific example, the data that is included in each subset of data can be overlapping (e.g., overlapping data). In this specific example, as shown in FIG. 5B, each piece of data can be included in more than one subset of data; however, each piece of data is preferably not included in all of the subsets. In a third specific example, the data the is included in each subset of data can be sequential (e.g., consecutive). In this specific example, as shown in FIG. 5C, a predetermined amount of data (e.g., number of satellite observations) can be included in a subset, then the next data (e.g., same amount, different amount, of satellite observations) can be included in another subset. In this specific example, the predetermined amount of data can be based a convergence criterion, a continuing criterion, a preferred amount of data (e.g., number of satellite observations such as selected heuristically, based on machine learning, optimal number of observations, number of observations that evenly divides the time period based on the number of filters, etc.), and/or in any suitable manner. However, the data included in each subset of data can be selected in any suitable manner.

The filter module(s) preferably function to process the data (e.g., subsets of data) using a set of filters (e.g., plurality of filters, filter set) and to determine one or more filter outputs. The set of filters preferably corresponds to a plurality of filters; however, the set of filters can correspond to a single filter. In variants, each filter can be associated with a separate filter module; however, additionally and/or alternatively, a filter module can be associated with more than one filter, and/or filter modules can be associated with any suitable number of filters. The filter module(s) is preferably in communication with the data module(s) and the validation module(s).

The system preferably uses one or more filters for each time period. The same and/or a different filter set (e.g., including different filter types, filter number, filter initializations, etc.) can be used across different time periods. The filters within a filter set (for a time period) can be: predetermined, automatically selected (e.g., based on filter states for a prior time period, based on data from a prior time period, etc.), or otherwise selected. Each filter within a filter set preferably receives a different data subset (e.g., different unique data subset) of the data set for the respective time period, but can additionally or alternatively receive the same data subset.

The filters are preferably Kalman filters (e.g., as described in the Method section); however, additionally and/or alternatively, the filters be extended Kalman filters, unscented Kalman filters, particle filters, and/or any suitable mean-square error filter and/or sensor fusion algorithm. The number of filters is preferably the same as the number of subsets of data; however, the number of filters can be more or less than the number of subsets of data. The number of filters can be constant and/or can be changed (e.g., decreased, increased). In a specific example, the system can include three filters; however, any suitable number of filters can be used. Each filter preferably operates independently from each other filter; however, some filters can be dependent on other filters.

The input(s) to each filter can include one or more of: a subset of data (e.g., a unique subset of data), the full set of data (e.g., all satellite observations received by the mobile receiver, by the reference stations, etc.; all corrected satellite observations; all sensor data; etc. such as associated with the time window), noise (e.g., an estimated noise spectrum, a simulated noise spectrum, known receiver noise, etc.), correction factors (e.g., atmospheric corrections such as corrections for ionosphere, troposphere, etc.; clock error such as satellite clock, receiver clock, reference station clock, etc.; hardware bias; antennae phase windup/PCO/PCV; etc.), and/or any suitable data and/or information. The inputs are preferably measured values; however, additionally and/or alternatively, the inputs can be modelled values, calculated values, predicted values, estimated values, and/or determined in any suitable manner. The inputs are preferably tagged (e.g., based on the observed satellite; the reference station; the sensor; the time such as time of receipt, time of processing, time of generation, etc.); however, the inputs can be untagged. In specific variants, the inputs can be transferred to the filter as they are detected (e.g., in real-time); however, the inputs can be transferred to the filter in batches, at a delayed time, and/or with any suitable timing. In a specific example, the input to each filter can be a unique subset of data (e.g., subset of satellite observations). In a second specific example, more than one filter can receive the same subset of data. In this specific example, each filter is preferably distinct (e.g., uses a different initialization such as seed, guess, etc.; is a different type of filter; etc.); however, the filters can be configured in any suitable manner. However, each filter can receive any suitable input(s).

Figure 6:
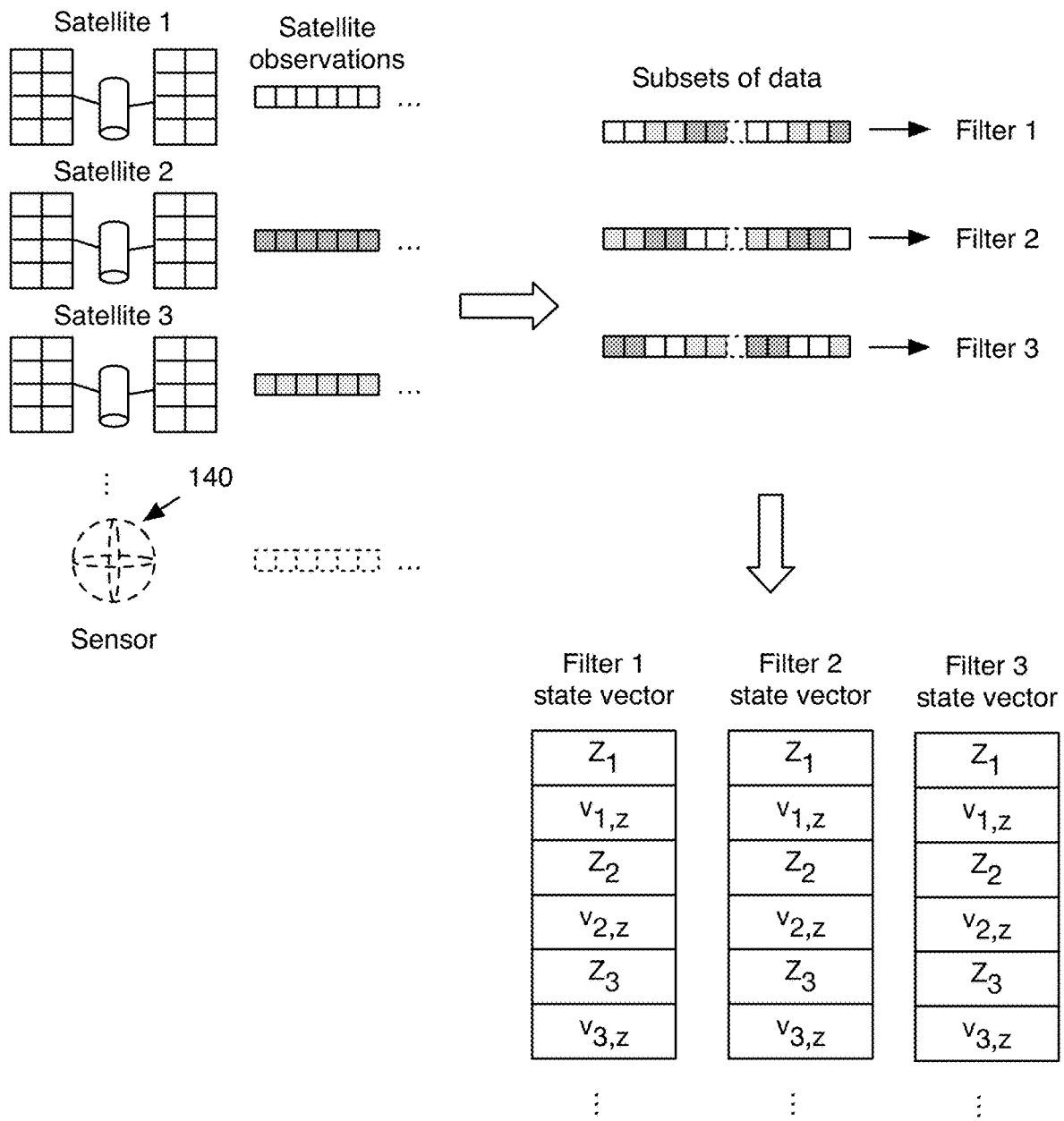
FIG. 6 is a schematic representation of an example of inputs and outputs to a plurality of filters, where $Z_i$ is an integer ambiguity hypothesis for satellite i, and $v_{i_z}$ is a residual calculated for integer ambiguity hypothesis $Z_i$.

Each filter preferably outputs a state vector. The states of the state vector can include one or more of: carrier phase ambiguity (e.g., float ambiguity, integer ambiguity, etc. such as for each observed satellite), validity of estimate, receiver position, pseudorange, atmospheric error, estimated error (e.g., estimated error in one or more states in the state vector), derivatives of one or more states (e.g., first, second, etc. derivative such as with respect to time, with respect to position, etc.), and/or any suitable state of the system. Each state is preferably associated with a specific data source (e.g., observed satellite, satellite constellation, mobile receiver, reference station, sensor, shown for example in FIG. 6, etc.); however, each state can be associated with any suitable information. In a specific example, if a filter receives satellite observations from four observed satellite, the filter output will preferably include four integer ambiguities (e.g., an integer ambiguity associated with each observed satellite) and four integer ambiguity errors. However, the filter output can include any suitable information. The state vector (e.g., output) of each filter is preferably the true value of the state; however, the state vector can be estimated values, predicted values, calculated values, current values, future values, measured values, and/or any suitable values. The state vector generated by each filter preferably includes the same states; however, the states can be based on the input to each filter, and/or the filter can generate any suitable states. The filter output(s) (e.g., state vector) is preferably transmitted (e.g., displayed) after the filter has converged (e.g., as determined by a validation module); however, the output(s) can be transmitted whenever the values update, based on a request (e.g., for current output values), based on timing (e.g., after a timeout, with a predetermined frequency, etc.), and/or at any suitable time. In a specific example, the state vector for each filter can include: an integer phase ambiguity $Z_i$ for each satellite i for which at least one satellite observation is included in the data subset processed by the filter and a residual (e.g., the estimated error) $v_{i,z}$ associated with the integer phase ambiguity. However, the state vector can include any suitable states.

The validation module preferably functions to determine whether the filters (e.g., all filters, a subset of the filters, etc.) have converged (e.g., separately, collectively, etc.). In a specific example, the validation module can determine if a single filter has converged on an integer ambiguity hypothesis associated with an observed satellite. In a second specific example, the validation module can determine if all of the filters (e.g., all of the filters that received a satellite observation associated with an observed satellite) converged on the same integer ambiguity hypothesis associated with the observed satellite. However, the validation module can be used in any suitable manner.

The filter convergence is preferably based on one or more convergence criterion; however, the filter convergence can be based on any suitable information. The convergence criterion can be one or more of: timeout (e.g., filter runs for an amount of time greater than a timeout time where the timeout time can, for example, be the same amount of time as the duration of the time window), a validation metric, a ratio test, an amount of data (e.g., number of satellite observations), geometry of the satellites, information dropping, a threshold (e.g., an error threshold, a threshold for differences between filters, etc.), and/or any suitable criterion can be used. In a specific example, information dropping can include dropping one or more satellite observation and/or state (e.g., input, output, etc.) of the filter. If the filter produces the same result with the dropped information, then the filter is considered to have converged. However, information dropping can have any suitable form. In a second specific example, can compare states of the state vector (e.g., states corresponding to a common source such as an observed satellite) from different filters. If these states match (e.g., are the same), then the plurality of filters have converged. However, convergence of the plurality of filters can additionally or alternatively be based on the receiver position estimate from each filter being less than a predetermined threshold, and/or any suitable convergence criterion for a plurality of filters can be used.

In specific variants, the validation module can test one or more continuing criteria (e.g., intermediate convergence criterion, for individual filters, for the set of filters associated with the time period, etc.). The continuing criteria are preferably used to dynamically update the filters (e.g., stop the filters, modify the data in the subset of data transmitted to each filter, add new filters, start a new time window, etc.); however, the continuing criteria can be used in any suitable manner. The continuing criteria are preferably tested one or more times before the convergence criterion; however, the continuing criteria can be tested at any suitable time (e.g., at the same time as the convergence criterion, after the convergence criterion). In specific variants, the continuing criteria can be the same as the convergence criterion; however, the continuing criteria and the convergence criterion can be different. In specific examples, the continuing criteria can include change in error (e.g., change in the estimated error for one or more states of the state vector, change in the residual for one or more states, etc.), threshold (e.g., time threshold; intermediate error threshold such as an error threshold greater than a convergence threshold; residual threshold such as an intermediate residual threshold, etc.), and/or any suitable continuing criteria can be used.

In specific variants of the system including one or more sensors 140, the sensors preferably function to measure (e.g., provide) sensor data (e.g., auxiliary data, validation data, back-up data, supplemental data, etc.). The sensor data can be used by one or more filters to assist (e.g., speed-up, correct, refine, etc.) the state vector determination (e.g., estimating the integer phase ambiguity). In a specific example, the sensor data can be used to estimate the receiver position at times when satellite observations are not received (e.g., in an urban canyon; due to an obstruction such as a billboard, weather, etc.; etc.). However, the sensor data can be used at any suitable time and in any suitable manner. The sensors are preferably in communication with the computing system. The sensors can be: on-board the external system, integrated into the mobile receiver (e.g., onboard the same external system, onboard a different external system) and/or be separate from the mobile receiver, or otherwise associated with the mobile receiver. The sensor data is preferably for the external system, but can additionally or alternatively be for the mobile receiver or any other suitable sensor reference. The sensor data can include: inertial data (e.g., velocity, acceleration), odometry, pose (e.g., position, orientation), mapping data (e.g., images, point clouds), temperature, pressure, ambient light, and/or any other suitable data. The sensors can include one or more of: inertial moment unit (IMU), accelerometer, gyroscope, magnetometer, odometer (e.g., visual odometry, wheel odomoetry, etc.), and/or any suitable sensors can be included.

5. Method

Figure 3:
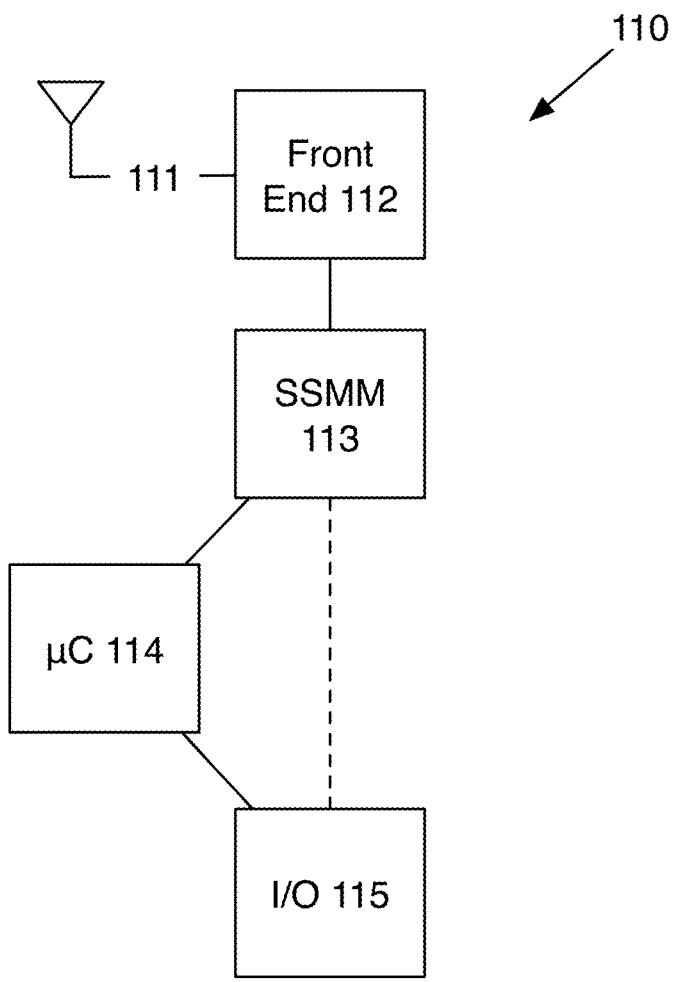
FIG. 3 is a diagram representation of an example of a mobile receiver of a system of an invention embodiment.

As shown in FIG. 3, the method 200 includes receiving satellite observations (e.g., a navigation satellite carrier signal) S210, determining state vectors S230, and determining a receiver position S240. The method can optionally include correcting the satellite observations S220.

One or more instances of the method can be run serially, in parallel, in a time-staggered manner, concurrently, or in any other suitable temporal relationship for a given system instance (e.g., single mobile receiver, single external system, etc.). One or more instances of the method can be run concurrently or in any other suitable temporal relationship across multiple system instances (e.g., multiple mobile receivers, multiple external systems, etc.).

The method 200 functions to estimate (e.g., determine) the position of a mobile receiver (e.g., satellite receiver) using a plurality of filters to calculate integer phase ambiguity. Each filter preferably determines the integer phase ambiguity based on a subset of data (e.g., satellite observations); however, each filter can use any suitable data. The use of a plurality filters preferably generates a position estimate (e.g., solution) in less time and/or with reduced computational resources than if the plurality of filters were not used; additionally or alternatively, the plurality of filters may be used to generate solutions with higher accuracy than otherwise possible, the plurality of filters may increase the robustness of integer phase ambiguity calculations in the face of outlier data, and/or the plurality of filters can be used in any suitable manner. In specific examples, the use of a plurality of filters may reduce the probability of outliers (e.g., data that can increase convergence time) being present in data (e.g., the subset of data) fed to a given filter.

S210 includes receiving one or more satellite observations (e.g., navigation satellite carrier signal). S210 preferably functions to measure (e.g., at the mobile receiver, at reference stations, etc.) one or more satellite observations (e.g., phase measurements. pseudo-range measurements, etc.) from an observed satellite that can be used, for example along with location correction data (received in Step S220) to calculate receiver position. S210 may additionally or alternatively include receiving Doppler (range-rate) measurement data, sensor data, and/or any suitable data. Satellite observations (e.g., navigation receiver carrier signals) are preferably received at the L1 frequency (1575.42 MHz), but may additionally or alternatively be received at the L2 frequency (1227.60 MHz) or any other suitable frequency. Navigation satellite carrier signals received in S210 can include signals from one or more satellite constellations (e.g., global satellite constellations, etc.). Examples of navigation satellite carrier signals may include GPS signals, GLONASS signals, Galileo signals, Beidou signals, satellite based augmentation system (SBAS) signals, and/or any other suitable navigation signal transmitted by a satellite. S210 is preferably performed before correcting the satellite observations S220 and/or creating the data subsets; however, S210 can be performed at the same time as S220. S210 is preferably performed before determining the state vectors S230; however, S210 and S230 can be performed at the same time and/or S230 can be performed before S210 (e.g., during different time windows).

S210 preferably includes receiving the navigation satellite carrier signal (e.g., an RF signal) at a mobile receiver (e.g., antenna, an RF antenna) and converting the signal to a digital baseband signal (e.g., at a front-end module). The satellite observations (e.g., digital baseband signal) is preferably used for: calculating the pseudo-range from the receiver to the satellite (e.g., using GNSS time-of-flight techniques) and measuring the relative phase of the carrier signal; however, the digital baseband signal can be used in any suitable manner. Additionally and/or alternatively, S210 may include receiving navigation carrier signal data in any suitable manner.

S210 is preferably performed with multiple satellites (e.g., observed satellites). The use of satellite observations (e.g., pseudo-range data, phase data, etc.) from multiple satellites can provide for more accurate positioning; however, any suitable number of satellites can be used.

In specific variants, S210 may include combining the L1 and L2 frequency signals for each satellite (e.g., observed satellite) to create a beat signal. The resulting beat signal preferably has a lower center frequency (~347.82 MHz) than either the L1 or L2 signals, which can allow for a smaller set of possible integer ambiguity values (e.g., if $|N| \leq 10$ in for an L1 signal, $|N| \leq 2$ for the example beat signal; wherein $|N|$ are the possible integer values). The beat signal (e.g., resulting signal) may additionally or alternatively possess other desirable properties (e.g., reduction in error such as ionospheric error). However, the beat signal can be generated by combining any suitable frequency components (such as any combination of two or more of L1, L2, L5, E1, E2, E5a, E5b, E6, G1, G3, etc. frequencies).

The data measured in S210 is preferably associated with (e.g., measured during) a time window (e.g., time period). In specific variants, after the time window has expired, the method can include repeating S210 during a second time window. The second time window can be the same duration as the time window and/or a different duration. The second time window preferably immediately follows the time window; however, the second time window can be delayed relative to the time window by any suitable amount. The (first and second) time windows are preferably separate and distinct (e.g., consecutive, nonconsecutive, etc.), but can alternatively overlap.

In variants of the method, S210 can include measuring sensor data. Measuring sensor data is preferably performed by one or more sensors. Measuring the sensor data can be performed at the same time as receiving the satellite observation; however, measuring the sensor data can be before and/or after receiving the satellite observations.

In a variation of an invention embodiment, the method 200 can include S211: transmitting carrier signal data (e.g., pseudo-range and/or phase data) from the receiver to a computer system (e.g., a remote computing system such as a computer at a reference station, a cloud computing server, a distributed computing platform, etc.). In this and other variations, S220 through S240 may additionally be performed on the computer system.

Optional step S220 preferably includes receiving location correction data (e.g., global corrections, local corrections, etc.) and/or satellite observations from a reference station or other source (e.g., a PPP correction provider, a distributed RTK correction platform). S220 preferably functions to receive correction data used to determine, for a given satellite signal, the location of the mobile receiver and/or to correct satellite observations based on location corrections. S220 preferably includes receiving correction information for each satellite signal (e.g., satellite observation) received in S210, but may additionally or alternatively include receiving location correction information for a subset of the satellite signals received in S210, and/or receiving any suitable correction information. S220 is preferably performed by a computing system (e.g., correction module of a computing system); however, any suitable component may be used. S220 is preferably performed before S230; however, S220 can be performed at the same time as S230 and/or after S230.

Location correction data may be of any form, including RTK corrections, PPP corrections, and/or any other data capable of correcting for various sources of GNSS error.

When S220 includes receiving location correction information for a subset of satellite signals in S210, S220 may include estimating location correction information for any of the subset of satellite signals for which location correction information is not received.

When corrections are provided from reference stations, S220 may include receiving location correction information from a single reference station, but may also include receiving location correction information from a plurality of reference stations. For example, S220 may include receiving location correction information for a first subset of satellites from one reference station while receiving location correction information for a second subset of satellites from another reference station. Additionally or alternatively, S220 may include receiving location correction information from multiple reference stations for a single satellite.

S220 may include receiving location correction signals over a UHF radio (e.g., at 915 MHz), but may additionally or alternatively include receiving location correction data over any suitable communication medium (e.g., an internet connection, a cellular connection, etc.).

When the location correction data is an RTK correction (e.g., RTK form), location correction data preferably includes carrier signal phase (e.g., as measured at the reference station), and reference station location information (or other identifying information linked to location). Location correction signals (e.g., location correction data) may additionally or alternatively include pseudo-range data from the reference station, positioning code data, and/or any other relevant data. Location correction signals are preferably formatted as Radio Technical Commission for Maritime Services (RTCM) messages (e.g., RTCMv3), but may additionally or alternatively be formatted according to any suitable standard or protocol. Reference stations used for transmitting location correction signals may include dedicated RTK reference stations, Continuously Operating Reference Stations (CORS), Network RTK solutions (including virtual reference station solutions), or any other suitable reference station.

In some embodiments, correcting the satellite observations in S220 can correct satellite observations according to methods described in relation to the atmospheric corrections (e.g., ionospheric and tropospheric) described in U.S. application Ser. No. 16/195,427, entitled "SYSTEMS AND METHODS FOR DISTRIBUTED DENSE NETWORK PROCESSING OF SATELLITE POSITIONING DATA" and filed on 19 Nov. 2018, which is incorporated herein in its entirety by this reference; however, the corrections can alternatively be generated in any other suitable manner.

S230, determining the state vector, preferably functions to calculate one or more states of the state vector using a plurality of filters, wherein each filter preferably determines the respective state vector using a subset of data (e.g., a unique subset of data). S230 is preferably performed by a computing system (e.g., one or more filter modules of a computing system); however, S230 can be performed by any suitable component. S230 is preferably performed prior to S240; however, additionally and/or alternatively, S230 can be performed at the same time as S240 and/or after S240 (e.g., in examples where a previously known receiver position is used, for example, to seed a filter such as to improve the speed and/or accuracy of integer ambiguity determination). S230 can be performed in real-time (e.g., the state vector can be calculated at substantially the same time as each satellite observation is made), delayed (e.g., the state vector can be calculated after receiving the complete dataset associated with the time period), asynchronously, and/or with any suitable timing.

In specific embodiments of the method, S230 preferably includes calculating integer phase ambiguity. Calculating integer phase ambiguity preferably functions to determine the absolute phase (and/or a related parameter) of a satellite carrier signal, which can enable the position of the mobile receiver to be calculated.

Integer phase ambiguity (e.g., phase ambiguity) is preferably calculated using double differenced measurements of satellite observations (e.g., double-differenced pseudo-range and relative phase). Alternatively, phase ambiguity may be calculated with any measurements (e.g., single- or zero-differenced satellite observations). Double-differenced measurements are preferably calculated by taking the difference of satellite observations from the mobile receiver and reference station (e.g., reference values); however, any suitable difference between measurements can be used. For example, the double-differenced measurements of pseudo range and phase for two satellites (satellite 1 and 2) can be modeled as $$\rho_{12} = (\rho_{mr} - \rho_{ref})_{i=1} - (\rho_{mr} - \rho_{ref})_{i=2}$$

$$\phi_{12} = (\phi_{mr} - \phi_{ref})_{i=1} - (\phi_{mr} - \phi_{ref})_{i=2}$$

where i is the satellite index, $\rho_{mr}$, $\phi_{mr}$ are pseudo-range and phase measurements at the mobile receiver, and $\rho_{ref}$, $\phi_{ref}$ are pseudo-range and phase measurements at the reference station.

For a mobile receiver and a reference station separated by a baseline vector b, the double differenced equations for pseudo-range $\rho$ and phase $\phi$ can additionally or alternatively be written as $$\nabla \Delta \rho = \begin{pmatrix} \rho_{10} \\ \vdots \\ \rho_{n0} \end{pmatrix} = \begin{pmatrix} e_1 - e_0 \\ \vdots \\ e_n - e_0 \end{pmatrix} \cdot b + \epsilon_\rho = DE \cdot b + \epsilon_\rho$$

$$\nabla \Delta \phi = \begin{pmatrix} \phi_{10} \\ \vdots \\ \phi_{n0} \end{pmatrix} = \frac{DE \cdot b}{\lambda} + N + \epsilon_\phi$$

where $e_n$ is the unit line-of-sight vector (e.g., from the mobile receiver, from the reference station, etc.) to satellite n, $\in_\rho$ and $\in_\phi$ represent noise, $\lambda$ is the wavelength of the carrier signal, and N is integer phase ambiguity. The use of double-differenced measurements can partially and/or fully cancel satellite clock errors, receiver clock errors, and atmospheric error; however, non-double-differenced measurements may be used (e.g., wherein clock errors and/or atmospheric errors can be included in the state space).

Alternatively, integer phase ambiguity may be calculated using single- or zero-differenced measurements of any relevant parameters. Other parameters (e.g., included in inputs to the filter(s)) that may be used for mobile receiver position calculation include those modeling tropospheric and ionospheric effects (which are not directly dependent on reference station but vary spatially/temporally), receiver clock error, receiver hardware bias, receiver antenna phase windup/phase center offset (PCO)/phase center variation (PCV) (which are unique to a given receiver/antenna but generally do not directly dependent on location), and other position error (which covers effects not otherwise explicitly modeled). Alternatively, integer phase ambiguities can be calculated using a LAMBDA method, AFM method, LSAST method, FARA method, and/or otherwise calculated.

S230 preferably includes generating phase ambiguity estimates using a Kalman filter (or other filter that estimates receiver state based on a time series of observations) but may additionally or alternatively include generating phase ambiguity estimates in any manner (e.g., using other filters). For example, S230 may include caching observations and performing a Gaussian process on the cached observations (e.g., enabling 'updates' in forward and reverse time). As a specific example, the mathematical expressions that follow are given with respect to a Kalman filter, but it is understood that the concepts embodied by these expressions may be adapted to other techniques for generating position estimates (and/or integer ambiguity).

The observations received in S210 may be formatted generally for position estimate generation as follows:

$$z_k = H_k x_k + n_k$$

where $z_k$ is the measurement (e.g., satellite observation, corrected satellite observation, sensor data, etc.) at time (or step) k, $x_k$ is the true state, $n_k$ is observation noise (preferably with zero mean and with known covariance; however, the observation noise can have any suitable form), and $H_k$ is the observation model that maps the true state space into the observed state space. The Kalman filter model further assumes that there is a relationship between states at different times given by $$x_k = F_k x_{k-1} + w_k$$

where $w_k$ is process noise (preferably with zero mean and with known covariance in general different from the observation noise covariance; however, the process noise can have any suitable form and/or values) and $F_k$ is the transition model that maps the true state at time k−1 to the true state at time k.

The observation vector z preferably includes pseudo-range and phase measurements, related to range (i.e., distance between the receiver and a given satellite) as follows:

$$\rho = r + I + \epsilon_\rho$$

$$\phi = \frac{r}{\lambda} - \frac{I}{\lambda} + N + \epsilon_\phi$$

where the I term accounts for ionospheric error and the epsilon terms account for other error. The state vector x preferably includes receiver position (e.g., x, y, z), and may additionally include other calculated estimates (e.g., phase ambiguity, ionospheric error terms, outputs, etc.).

S230 preferably includes producing a set of hypotheses for the integer ambiguity value N. For example, starting with the equation $$\begin{pmatrix} \nabla \Delta \phi_i \\ \lambda \nabla \Delta \phi_i - \nabla \Delta \rho_i \end{pmatrix} = \begin{pmatrix} \frac{1}{\lambda} DE_i & I \\ 0 & \lambda I \end{pmatrix} \begin{pmatrix} b_i \\ N \end{pmatrix}$$

and noting that for any matrix A operating on a normally distributed random variable x with covariance $\Sigma$, the random variable y=Ax will have covariance $A\Sigma A^T$. For the matrix A there are subspaces Ker[A] for which any vectors $x \in$ Ker [A] have the property 0=Ax. Thus, a matrix $Q_i$ can be constructed such that $0=Q_i DE_i$ and this matrix can be applied to form a second equation:

$$\begin{pmatrix} Q_i \nabla \Delta \phi_i \\ \lambda \nabla \Delta \phi_i - \nabla \Delta \rho_i \end{pmatrix} = \begin{pmatrix} \frac{1}{\lambda} Q_i DE_i & Q_i \\ 0 & \lambda I \end{pmatrix} \begin{pmatrix} b_i \\ N \end{pmatrix} = \begin{pmatrix} 0 & Q_i \\ 0 & \lambda I \end{pmatrix} \begin{pmatrix} b_i \\ N \end{pmatrix} = \begin{pmatrix} Q_i \\ \lambda I \end{pmatrix} N$$

This equation relates phase change and pseudo-range directly to N (without inclusion of the baseline vector b). This equation can be used as a measurement equation of a Kalman filter of S230 without a corresponding dynamic transition model; however, a dynamic transition model can be used.

Computing $Q_i$ may require knowledge of the line of sight vectors contained in $DE_i$. S230 preferably includes computing the line of sight vectors from an estimate of b, (which can, for example, be found using a set of phase measurements and an estimate for N). Additionally or alternatively, S230 may include computing the line of sight vectors from reference station data, or in any other suitable manner.

For a particular set of line of sight vectors, $Q_i$ is preferably computed by generating a matrix whose rows form a basis for the left null space of DE, or Ker[$DE^T$]. This generation is preferably done via QR decomposition; however, $Q_i$ may additionally or alternatively be generated using singular value decomposition or any other suitable method.

From these equations, a set of hypotheses can be generated. Measurements arising from ambiguity vector N are expected to be normally distributed and to have a mean given by the equation $$\begin{pmatrix} Q_i \nabla \Delta \phi_i \\ \lambda \nabla \Delta \phi_i - \nabla \Delta \rho_i \end{pmatrix} = \begin{pmatrix} Q_i \\ \lambda I \end{pmatrix} N$$

The corresponding covariance may be determined from the results of a Kalman filter of S230, reducing the set of likely hypotheses (as compared to covariance derived directly from the measurement model). From this information, a distribution of the set of hypotheses can be found.

S230 preferably includes initializing the Kalman filter(s). The initialization can use an instantaneous measurement (such as the first measured value), a previous measurement, a previous filter state vector, the state vector calculated by a different filter, a random value (e.g., randomly and/or pseudo-randomly generated state vector), and/or any suitable value can be used for the initialization. The initialization is preferably determined (e.g., performed) at the start of the time period and/or before the filter has determined a state vector; however, the initialization can be stored (e.g., to be retrieved from memory), in response to a trigger (e.g., convergence criterion, continuing criteria, etc.) and/or the initialization can occur with any suitable timing. S230 can optionally include reinitializing the Kalman filter(s) such as in response to a trigger.

While this is an example of how integer ambiguity hypotheses may be generated, it is understood that integer ambiguity hypotheses may be generated in any manner.

S230 preferably includes running a plurality of filters (or other processes) on observation data concurrently or simultaneously (note that "simultaneously" may literally mean processes running at the same time, but may also mean any configuration where multiple filters are operated in a given time period to produce a position estimate from the output of those multiple filters). Each of the plurality of filters preferably operates on a subset of data (e.g., a unique subset of the data); however, two or more of the filters can operate on the same subset of data, the filters can operate on the set of data (e.g., collected during the time window), and/or the filters can operate on any suitable data. In a specific example two or more filters can use the same subset of data from the time period. In this example, the filters operating on the same subset of data can have a different initialization. However, the filters can be different types of filters (e.g., a Kalman filter and a particle filter, a Kalman filter and an extended Kalman filter, etc.), and/or the any other suitable filter, used in any suitable manner.

As shown in FIG. 4A, S230 preferably includes running the filters on interleaved but non-overlapping observation data; for example, filters 1 2 and 3 may operate on every first, second, and third observation (respectively) of each group of three satellite observations. Alternatively, S230 may include running the filters on interleaved and overlapping observation data, as shown for example in FIG. 4B. However, S230 can include running the filters on any suitable subset of data.

S230 preferably includes running filters until a convergence criterion (e.g., convergence threshold, time threshold, etc.) is met (e.g., reached); however, the filters can be operated in any suitable manner. The convergence criterion can be per filter, for several filters, and/or for all of the filters in the plurality of filters. In a specific example, a convergence threshold may require that several filters of the plurality of filters reach individual convergence (e.g., the estimated error in the integer ambiguity is less than a convergence threshold) and/or time thresholds. For example, S230 may include running five filters until three reach a convergence threshold (such converge to the same value for the integer ambiguity for one or more observed satellites).

S230 preferably includes, when the convergence criterion is satisfied (e.g., determined to be satisfied), stopping the calculation of the state vector (e.g., to proceed to S240); however, additionally or alternatively, when the convergence criterion is satisfied, S230 can include testing the validity of the state vector (e.g., using a validation module), testing one or more additional convergence criterion (e.g., when a time threshold is satisfied proceeding to test a convergence threshold), and/or S230 can include any suitable steps. When the convergence criterion is not satisfied, S230 can include stopping one or more filters (e.g., the filters that did not meet the convergence criterion), start a new time period (e.g., return to S210 and associate the satellite observations with a new time window), restart the filters (e.g., with the same and/or a different subset of data, with a new initialization, etc.), change the time window (e.g., extend the time window to collect more observations), modify the filter(s) (e.g., type, number, subsets of data sent to each filter, etc.), transmit a message (e.g., 'unable to converge'), and/or S230 can include any suitable steps when the convergence criterion is not met.

In variants, S230 can include determining when a continuing criteria (e.g., intermediate convergence criterion) has been satisfied. When the continuing criteria has been satisfied, S230 preferably continues without changing; however, when the continuing criteria has been met, S230 can additionally and/or alternatively include testing the convergence criterion, stopping one or more filters (e.g., because convergence has already been achieved, because convergence between filters is predicted to not occur, etc.), modify one or more filters (e.g., add filters, modify the input(s), output(s), filter type, etc., such as to improve the probability of convergence, the speed of convergence, the accuracy of the value, etc.), and/or perform any suitable response. When the continuing criteria is not satisfied, S230 can include stopping one or more filters, add one or more new filters (e.g., and generating one or more new subsets of the data associated with the filters), modifying one or more filters (e.g., change the inputs such as increase the amount of data sent to the filter; change the data such as data source, data type, etc.; etc.), and/or S230 can include any suitable response. The continuing criteria is preferably determined for each individual filter, but can additionally or alternatively be determined for the filter set (e.g., active filter set) or any other suitable set of filters. The continuing criteria can be determined: for each time step or datum; periodically; randomly; upon satisfaction of a predetermined event (e.g., time expiration); or at any other suitable time.

As an illustrative example, S230 may include running ten filters until five reach a convergence threshold and stopping one or more filters if they fail to meet a continuing criterion (e.g., intermediate convergence thresholds such as estimated by residuals or by fitting residual values over time). In this illustrative example, if two of the ten filters are far from convergence at some intermediate time period (e.g., within the time period, within the time threshold, etc.); those filters may be stopped. However, S230 can include any suitable convergence criterion and/or response to the convergence criterion.

In a second specific example, determining when a filter has converged can include dropping information (e.g., one or more states) from the state vector. In this example, the mobile receiver position can be determined from the state vector. The mobile receiver position can then be determined again using a subset of the state vector (e.g., dropping information from the state vector). If the mobile receiver position agrees for the full state vector and the dropped information state vector, then the filter can be converged (e.g., convergence criterion can be satisfied). If the mobile receiver position from the state vector and the subset of the state vector do not agree, then the filter may not have converged. However, determining when a filter has converged can include any suitable convergence criterion.

In a third specific example, determining when the plurality of filters have converged can include checking if each state of the respective filter state vectors (e.g., corresponding to the same observed satellite) match. If the states of the state vectors match, the filters can be converged; however, if the states do not match, the filters may not have converged. However, determining when the plurality of filters have converged can include determining if the receiver position calculated from the state vector for each filter matches, and/or can include any suitable steps.

S230 may include modifying the number of filters, their type of operation, and the data they operate on at any time.

S230 may include dynamically altering which data (e.g., satellite observations, sensor data, etc.) is processed by which filters. Dynamically altering which data is processed by which filter can be in response to a convergence event (e.g., filter convergence, convergence criterion being satisfied, continuing criteria being satisfied, etc.), timing (e.g., predetermined time), data observation (e.g., receive new data such as from sensor, satellite, satellite constellation, etc.; dropped data signal such as in urban canyon, loss of line-of-site to satellite, etc.; etc.), and/or at any suitable time.

For example, S230 may include directing observations to filters based on an estimated convergence time (e.g., observations are directed to filters with longer estimated time to convergence) or based on filter load (e.g., how many observations a filter has processed at some point, how many observations from an observed satellite, etc.). S230 may additionally or alternatively include directing data (e.g., observations) to filters based on filter parameters and/or filter configuration. As another example, S230 may include directing observations to filters based on characteristics of the observations (e.g., if observations are linked to similar IMU data, those observations may be processed at the same filter).

S230 may additionally or alternatively include combining filter outputs in any manner (e.g., averaging, etc.) or using filter outputs in any manner to validate a given result (e.g., a parameter output of integer ambiguity). For example, S230 may include flagging a result as valid if a certain number of filters have converged on that result beyond a threshold value.

S230 may additionally or alternatively include performing a cascading filter update. In an illustrative example, S230 may include updating a first subset of filters (e.g., one filter of ten), and evaluating (by result quality, convergence time, and/or any other criterion) the effect of this update. In response to this evaluation, S230 may selectively update a second subset of filters (e.g., two additional filters, the remainder of filters, etc.). Filters chosen for this second subset may be chosen in any manner (e.g., on epoch). However, performing a cascading filter update can be performed in any suitable manner.

In some specific variants, S230 may include reparametrizing the hypothesis search space for the integer ambiguity (e.g., to reduce the time and computational resources required to perform this process). Typically, in such an example, after hypotheses for the integer phase ambiguity are identified, they are transformed back to the original parameter space. However, S230 may additionally or alternatively include attempting to fix integer ambiguity in the transformed space (e.g., where not all position parameters can be fixed) prior to transforming back to the original space, enabling the constraints in the transformed search space to be used as constraints for the Kalman filter.

Preferably, all hypotheses (e.g., integer ambiguity hypotheses) within a particular confidence interval (which is used to bound the search space) are tested. The number of hypotheses contained within this interval (hereinafter referred to as the testing set) can depend on the covariance for the N distribution. Since N is preferably computed for several satellites to determine the position of the mobile receiver, the total set of hypotheses that need to be tested can depend on the covariances for each satellite's associated N value and the number of satellites. However, additionally and/or alternatively, the set of hypotheses can depend on any suitable parameter.

Hypotheses are preferably tested using an F-test operating on the ratio of probabilities of the two best hypotheses, but hypotheses may additionally or alternatively be tested in any manner. The degrees of freedom for this test (which can test hypotheses generated from data collected over multiple epochs and/or time periods) is preferably set based on calculations of per-epoch degrees of freedom, but may not be a simple sum of these degrees of freedom.

In some embodiments, determining the integer phase ambiguity in S230 can calculate the integer phase according to methods described in relation to the methods described in U.S. Pat. No. 9,933,528, entitled "SYSTEMS AND METH- ODS FOR REAL TIME KINEMATIC SATELLITE POSITIONING" and filed on 12 Feb. 2015, which is incorporated herein in its entirety by this reference; however, the integer phase ambiguity can additionally or alternatively be calculated in any other suitable manner.

Step S240 includes determining the receiver position. Step S240 preferably functions to calculate the position of the mobile receiver (and/or external system) based on the state vector (e.g., the integer ambiguity values, converged integer ambiguity values, etc.) computed in Step S230. S240 is preferably performed by the computing system; however, S240 can additionally and/or alternatively be performed by the mobile receiver, a reference station, and/or by any suitable component. The mobile receiver position is preferably determined from the state vector; however, the mobile receiver position can be determined using any suitable data. For specific embodiments using RTK, after the integer ambiguity values (e.g., set of N's) have been determined, the baseline vector b for the mobile receiver may be determined from the value(s) for N and phase/pseudo-range measurements. The baseline vector can correspond to the position of the mobile receiver relative to a reference station; therefore, if the location of the reference station is known, the position of the mobile receiver (e.g., relative to the reference station(s)) can be determined by applying b to the reference station location (e.g., coordinates). S240 may additionally or alternatively include calculating receiver position from N in any manner (e.g., using a PPP model instead of RTK).

Note that S240 may be performed simultaneously with the calculation of integer ambiguity as described in S230.

S240 may additionally include transmitting or storing receiver position data. For instance, S240 may include transmitting receiver position data from the receiver to an external computer over UHF radio, the internet, or any other suitable means.

Figure 7:
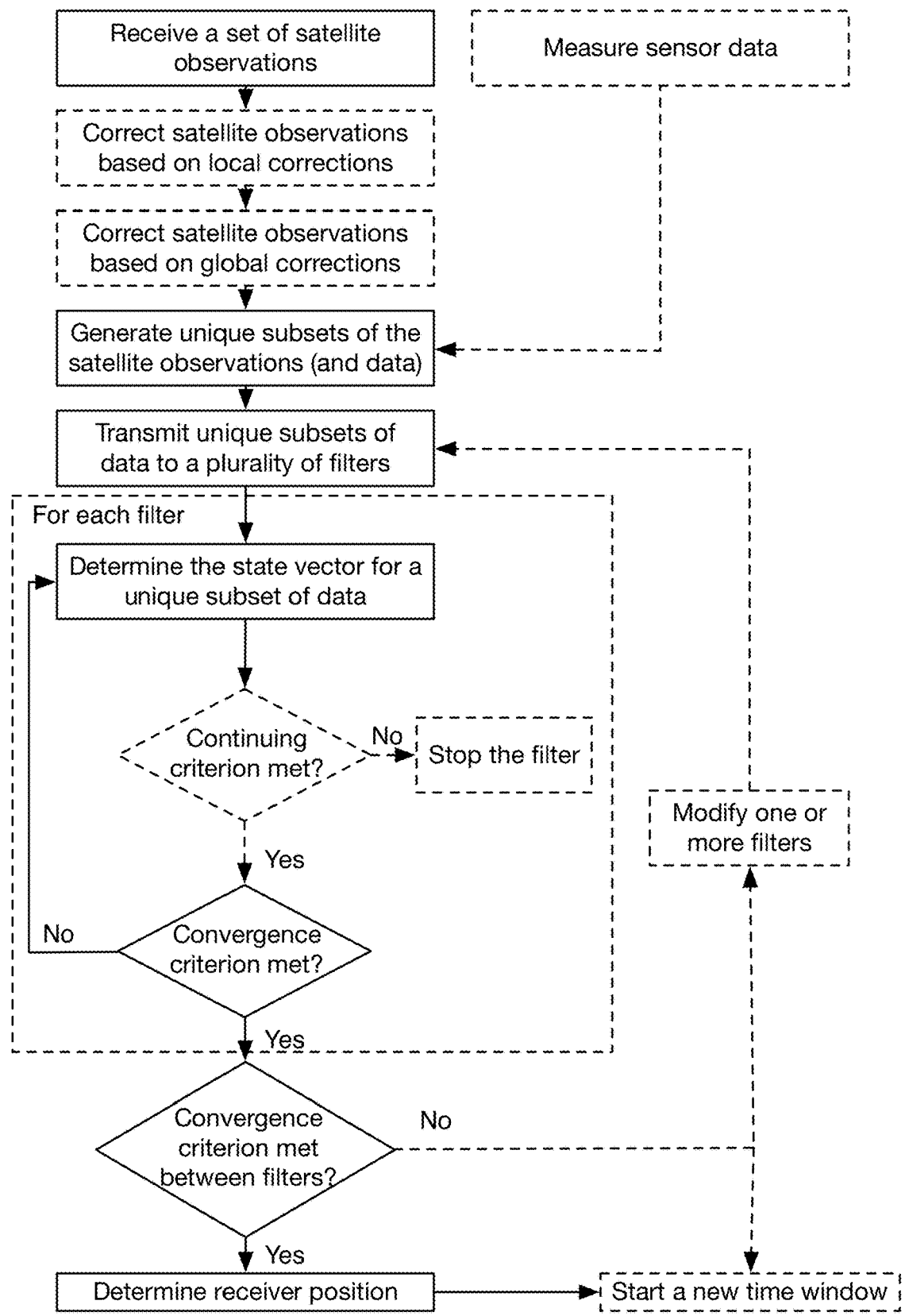
FIG. 7 is a schematic flow chart of an embodiment of the method.

In a specific example, as shown in FIG. 7, a method for determining a position of a mobile receiver can include: receiving, at the mobile receiver, a set of satellite observations, the set of satellite observations comprising code data and carrier phase data, the set of satellite observations corresponding to a set of satellites (e.g., corresponding to one or more satellite constellations such as GPS, GLONASS, BDS, Galileo, etc.), wherein the set of satellite observations are associated with a time period. In this specific example, the method can include correcting the set of satellite observations, for example based on a location correction received from a set of reference stations. Correcting the set of satellite observations can include calculating a double differenced satellite observation. In this specific example, the set of satellite observations can be used to independently determining a state vector (e.g., an integer ambiguity hypothesis) at each of a plurality of filters, wherein each filter determines the respective integer ambiguity hypothesis based on a unique subset of data (e.g., a unique subset of the set of satellite observations). The unique subsets of data can include nonconsecutive satellite observations, consecutive satellite observations, and/or shared (e.g., overlapping) satellite observations; however, the unique susbsets of data can include any suitable data. Each unique subset of data preferably includes at least one satellite observation from a common satellite (and/or satellite constellation). The plurality of filters preferably includes a Kalman filter; however, any suitable filter(s) can be included. In this example, the unique subsets of satellite observations can be updated based on an estimated convergence time for the respective filter that is processing the unique subset of data. In this specific example, the method can include measuring a set of sensor data associated with the time period wherein each filter of the plurality of filters can uses a subset of the sensor data to determine the integer ambiguity. In this example, after a convergence criterion is satisfied, the method can include determining a converged integer ambiguity based on the respective integer ambiguity hypotheses. The convergence criterion can be a time threshold (e.g., matching the time period, a distinct time threshold, etc.), an integer ambiguity hypotheses value (e.g., the states and/or state vectors corresponding to each filter match), an integer ambiguity residual threshold, and/or any suitable convergence criterion. In this specific example, the method can include determining satisfaction of a continuing criterion (e.g., before satisfying the convergence criterion), where the continuing criterion can be an estimated residual value greater than an intermediate convergence threshold. The method can include stopping a filter when the filter does not satisfy the continuing criterion. In this example, the method can include determining the position of the mobile resolver based on the converged integer ambiguity. In this example, the method can include, for a second time window, after the time window, receiving a second set of satellite observations associated with the second time period; at each of a second plurality of filters (e.g., the same as the plurality of filters, different from the plurality of filters, a subset of filters from the plurality of filters included in the second plurality of filters, etc.), determining a second integer ambiguity hypothesis associated with a second unique subset of the satellite observations; and after determining a second convergence criterion has been met, updating the position of the mobile resolver based on the second integer ambiguity hypotheses. However, the method can include any suitable steps and/or be performed in any suitable manner.

The method 200 is preferably implemented by the system 100 but may additionally or alternatively be implemented by any system for processing of satellite position data.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for determining a position of a mobile receiver comprising:
   receiving, at the mobile receiver, a set of satellite observations, the set of satellite observations comprising code data and carrier phase data, the set of satellite observations corresponding to a set of satellites, wherein the set of satellites correspond to a plurality of satellite constellations, wherein the set of satellite observations are measured during a time period;
   correcting the set of satellite observations based on a location correction received from a set of reference stations;
   while a residual value of each of a plurality of Kalman filters remains below an intermediate residual threshold, independently determining an integer ambiguity hypothesis at each of the plurality of Kalman filters, wherein each Kalman filter determines the respective integer ambiguity hypothesis based on a unique subset of the set of satellite observations, wherein the intermediate residual threshold is greater than a mutual residual threshold;

determining that the residual value associated with each Kalman filter of the plurality of Kalman filters is less than the mutual residual threshold, wherein the mutual residual threshold is a threshold for differences between the Kalman filters;

after each residual value falls below the mutual residual threshold, determining a converged integer ambiguity based on the respective integer ambiguity hypotheses; and determining the position of the mobile receiver based on the converged integer ambiguity.

2. The method of claim 1, wherein each unique subset of the satellite observations comprises nonconsecutive satellite observations from the set of satellite observations.

3. The method of claim 1, further comprising stopping a Kalman filter from the plurality of Kalman filters when the continuing criterion is not satisfied for the respective Kalman filter.

4. The method of claim 1 further comprising:
measuring a set of sensor data associated with the time period, wherein the sensor data is associated with an inertial measurement unit (IMU); and
wherein each of the set of Kalman filters uses at least a subset of the sensor data to determine the respective integer ambiguity hypothesis.

5. A method for determining a position of a mobile receiver comprising:
receiving, at the mobile receiver, a set of satellite observations, the set of satellite observations comprising code data and carrier phase data, the set of satellite observations corresponding to a set of satellites, wherein the set of satellite observations are associated with a time period;
independently determining an integer ambiguity hypothesis at each of a plurality of filters, wherein each filter determines the respective integer ambiguity hypothesis based on a unique subset of the set of satellite observations;
determining that the plurality of filters have collectively converged when a residual value from each filter of the plurality of filters falls below a mutual residual threshold, wherein the mutual residual threshold is a threshold for differences between the filters;
after the plurality of filters have collectively converged, determining a converged integer ambiguity based on the respective integer ambiguity hypotheses; and
determining the position of the mobile receiver based on the converged integer ambiguity.

6. The method of claim 5, further comprising correcting the set of satellite observations before determining the integer ambiguity hypotheses.

7. The method of claim 6, wherein correcting the set of satellite observations is based on a location correction received from a set of reference stations.

8. The method of claim 6, wherein correcting the set of satellite observations comprises calculating a set of double differenced satellite observations.

9. The method of claim 5, wherein the plurality of filters comprises a Kalman filter.

10. The method of claim 5, wherein each unique subset of the satellite observations comprises nonconsecutive satellite observations from the set of satellite observations.

11. The method of claim 5, wherein each unique subset of the satellite observations comprises consecutive satellite observations from the set of satellite observations.

12. The method of claim 5, wherein two or more of the unique subsets of satellite observations comprise a shared satellite observation from the set of satellite observations.

13. The method of claim 5, wherein each satellite of the set of satellites corresponds to a satellite constellation, wherein the satellite constellation is selected from the group comprising global positioning system (GPS), global navigation satellite system (GLONASS), BeiDou navigation satellite system (BDS), and Galileo.

14. The method of claim 5, wherein every unique subset of the satellite observations comprises at least one satellite observation sampled by a common satellite from the set of satellites.

15. The method of claim 5, wherein determining that the plurality of filters have collectively converged comprises each of the integer ambiguity hypotheses having the same value.

16. The method of claim 5, further comprising determining satisfaction of a continuing criterion for each filter before determining that the plurality of filters have collectively converged.

17. The method of claim 16, further comprising stopping a filter when the continuing criterion is not satisfied for the respective filter.

18. The method of claim 16, wherein determining satisfaction of the continuing criterion for each filter comprises determining that the respective residual value for the filter falls below an intermediate residual threshold.

19. The method of claim 16, wherein the continuing criterion comprises a time threshold corresponding to an amount of time each filter operates.

20. The method of claim 5, wherein for a second time period after the time period, the method further comprises:
receiving a second set of satellite observations associated with the second time period;
at each of a second plurality of filters, determining a second integer ambiguity hypothesis associated with a second unique subset of the satellite observations; and
after determining a second convergence criterion has been met, updating the position of the mobile receiver based on the second integer ambiguity hypotheses.

21. The method of claim 20, wherein the second plurality of filters is distinct from the plurality of filters.

22. The method of claim 5, further comprising:
measuring a set of sensor data associated with the time period; and
wherein each filters of the plurality of filters uses at least a subset of the sensor data to determine the integer ambiguity hypothesis.

23. The method of claim 5, further comprising updating the unique subsets of the satellite observations based on an estimated convergence time for the respective filter, wherein updating a given unique subset of the satellite observations comprises at least one of: adding satellite observations to or removing satellite observations from the unique subset of the satellite observations.

* * * * *